United States Patent [19]

Bollfrass et al.

[11] Patent Number: 4,588,213
[45] Date of Patent: May 13, 1986

[54] THREADED PIPE CONNECTION

[75] Inventors: Charles A. Bollfrass, Houston; Kenneth D. Chelette, Katy, both of Tex.

[73] Assignee: Thread Technology International, Inc., Houston, Tex.

[21] Appl. No.: 538,768

[22] Filed: Oct. 5, 1983

[51] Int. Cl.$^4$ .............................................. F16L 55/00
[52] U.S. Cl. ............................... 285/187; 285/332.3; 285/333; 285/334.4; 285/355; 285/350; 277/26
[58] Field of Search ................. 285/332.2, 332.3, 333, 285/334, 334.4, 355, 390, 350, 349, 187; 403/343; 277/26

[56] References Cited

U.S. PATENT DOCUMENTS

| 2,183,644 | 12/1939 | Frame ................................. 285/333 |
| 2,587,544 | 2/1952 | Sneddon ......................... 285/390 X |
| 2,907,589 | 10/1959 | Knox ............................... 285/349 X |
| 2,980,451 | 4/1961 | Taylor et al. ..................... 285/332.3 |
| 3,047,316 | 7/1962 | Wehring et al. . |
| 3,079,181 | 2/1963 | Wissel ............................... 285/333 |
| 3,100,656 | 8/1963 | MacArthur . |
| 3,572,777 | 3/1971 | Blose . |
| 4,085,951 | 4/1970 | Morris . |
| 4,121,862 | 10/1978 | Greer ............................. 403/343 X |
| 4,346,920 | 8/1982 | Dailey ............................ 285/334 X |

FOREIGN PATENT DOCUMENTS

| 951712 | 10/1956 | Fed. Rep. of Germany ...... 403/343 |
| 678613 | 9/1952 | United Kingdom ................ 285/334 |
| 538126 | 3/1977 | U.S.S.R. ............................ 285/333 |

OTHER PUBLICATIONS

A.S.M.E. Paper 83-Pet 11-Jan. 30-Feb. 3, 1983 API Connection Modification to Improve Pressure Integrity; Bollfrass et al.
Coupling Procedure Modification Improves Sealing Integrity of API Connections; Bollfrass et al; Oil & Gas Journal 4/4/83 pp. 131-135.
Leak Resistance Limit-Tubular Products 12 pp. Thomas L. Blose Jul. 21, 1970.

Primary Examiner—Dave W. Arola
Attorney, Agent, or Firm—John D. Watts

[57] ABSTRACT

In the preferred embodiment, this invention provides a threaded pipe coupling for connection with a conventional threaded pipe end so as to effect improved sealing against internal fluid pressure and against external fluid pressure as may be required in an oil or gas well. The coupling form causes the thread contact pressure to be greater at the maximum and minimum thread contact diameters than exists at intermediate points along the length of thread contact. An auxiliary plastic seal that will undergo thermal cycling is also provided.

10 Claims, 10 Drawing Figures

THREADED PIPE CONNECTION

TECHNICAL FIELD

Tapered pipe threads have been used for many years for connecting and sealing the ends of pipes in many industries, such seals being primarily dependent on the use of a paste like sealing compound to seal leak paths inherent between conventional mating pipe threads. However, in far too many cases, fluid pressures, thermal changes and mechanical forces cause the paste to gradually flow out or dry and shrink so as to cause a leak. Recent use of plastic tape wrapped around the male thread before assembly has in some cases, produced better sealing but in general, the same end result occurs over a period of time. Such leaks occurring in refineries, factories, gas wells and other industries all too frequently cause injuries, deaths, plant shutdowns and economic losses to workers and companies.

So as to minimize such losses, industry construction and operating codes such as A.S.M.E. have severely limited the use of threaded pipe connections to small sizes and to low pressures, specifying the mandatory use of welded or flanged connections. However, there are needs for high pressure threaded pipe connections where welded or flanged connections cannot be used. Such a need may best be shown for use in oil and gas wells where the hole size and tension load requirements prohibit the use of a flange and the danger of fire prohibits the welding of pipe ends together.

BACKGROUND ART

Several types of pipe joints have been developed over the years for the purpose of solving the leakage problem. Perhaps the most successful type, depicted in U.S. Pat. No. 4,085,951, a special premium cost connection that requires very special care and handling. Said connector has been shown to leak when slight damage occurs on surfaces as at 12 or 14, hence the need for adding the plastic ring 24. However, no provision has been made for thermal expansion of the "compressible ring" and upon an increase in temperature, differential thermal expansion of the plastic ring causes an undesireable increase in the connection hoop stress.

U.S. Pat. No. 2,907,589 explains the susceptability of the Hydril connector to damage, in columns 1 and 2, which may leak due to a variety of reasons. The same patent discloses another plastic seal ring and although "end clearance may be provided to allow for dirt and sand or for machining tolerances" no definite room is provided for thermal expansion of the plastic ring. Such a condition may provide an erratic tendency to seal, giving a false assurance in a dangerous situation.

U.S. Pat. No. 2,980,451 discloses a plastic ring deposed intermediate the engaged threads and confined so as to "extrude" the plastic, clearly allowing for no thermal expansion of the plastic and allowing for a progressive relaxation of the plastic seal which in the presence of changing temperatures and pressures, in time allows leakage. U.S. Pat. No. 3,047,316 also allows for extrusion of a plastic ring but makes no provision for sealing of the plastic ring after thermal bulk contraction occurs.

U.S. Pat. Nos. 3,572,777 and 3,100,656 show soft seals trapped by the end of the male connector but make no provision to protect the soft seals against: blowout by external pressure; erosion and wear from internal abrasive fluid flow.

Conventional pipe threads utilizing tapered threads wherein the pitch diameter of the mating threads lie along only one conical path, see FIG. 1, are still by far the most commonly used, and necessarily have machining tolerance for that taper. After extensive study of experimental and field results over the years, the American Petroleum Institute has recognized that should the male thread have a faster taper than the female thread, even though within tolerance, see FIG. 2, that the seal diameter will be toward the largest diameter of engaged threads which in turn, produces a greater hoop stress on the coupling than would occur had the male thread been machined with a slower taper than the female thread. Therefore, such threaded connections will be derated pressurewise, due to the lesser thread contact pressures that may be generated between the male and female threads; using a given wall thickness of the coupling.

A paper presented by Thomas L. Blose on July 21, 1970 to modify API 8 Round Thread Casing Couplings proposed the use of a second taper within the coupling, toward the small end of the engaged threads, having a steeper taper than the remaining threads so as to ensure the maximum sealing pressure being at the minimum possible seal diameter, thus preserving a higher pressure rating for the connection. However, no such coupling has been made available to the industry to applicants best knowledge. API paper 83-PET presented by the applicants discloses information relative to the instant invention as does their publication in the "Oil and Gas Journal" on Apr. 4, 1983.

DISCLOSURE OF INVENTION

The present invention provides a threaded pipe connection that ensures greater contact pressure between the mating threads at each end of the engaged thread length than the average contact pressure between the entire length of the engaged threads. Thus, a seal area is accomplished near the least diameter end of the engaged threads to thereby gain a higher rating against internal fluid pressure. Also, a seal area against external fluid pressure is accomplished near the greatest diameter of the engaged threads to thereby prevent external fluid pressure from acting against a lesser thickness of the male thread, to thereby which in turn gain a higher rating against external fluid pressure.

To ensure a seal against high internal pressure even in the absence of sufficient sealing compound and under conditions of changing temperatures, a plastic seal ring may be provided near the small diameter end of the engaged threads within an annular space sufficiently larger in volume than the plastic seal ring so as to allow for thermal expansion without extruding the seal ring by thermal expansion.

BEST MODE FOR CARRYING OUT THE INVENTION

Figure 3:
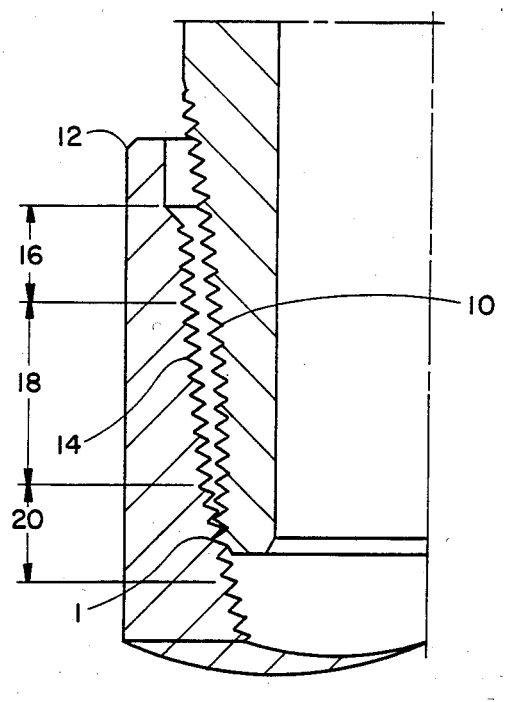
FIG. 3 illustrates a conventional male pipe thread made up hand tight into a female thread formed according to the present invention.

For cooperation with a conventional male pipe thread shown as 10 in FIG. 3, a coupling formed in accord with the present invention is shown generally at 12, the two members being made up to the hand tight position. Coupling 12 comprises a continuous thread as at 14 which may include three different sections 16, 18 and 20, each having a different taper angle. Section 18 may have a taper angle substantially the same as does the male pipe thread 10, section 16 may have a smaller taper angle than does the male pipe thread and section 20 may have a greater taper than does the male pipe thread.

Figure 4:
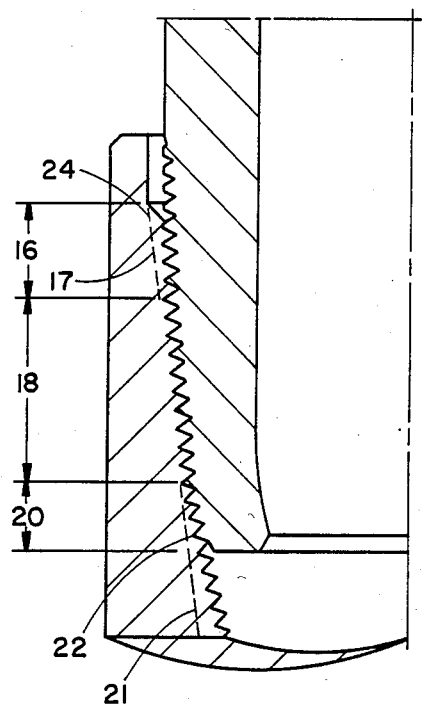
FIG. 4 is the same as FIG. 3 except the connection has been made up power tight, to the operating position.
Figure 1:
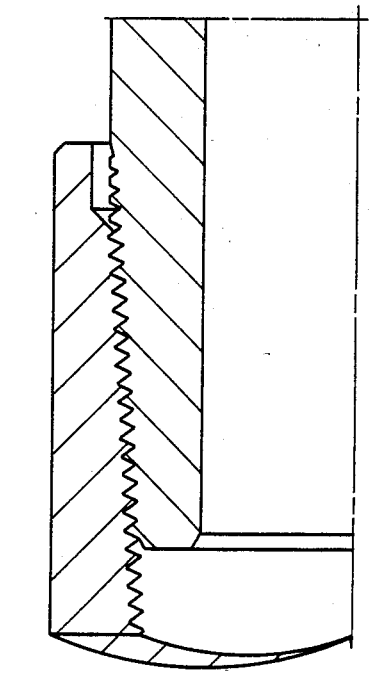
FIG. 1 is a fragmentary section of a conventional threaded pipe connection wherein tolerances allow for perfect matching of the tapers.
Figure 2:
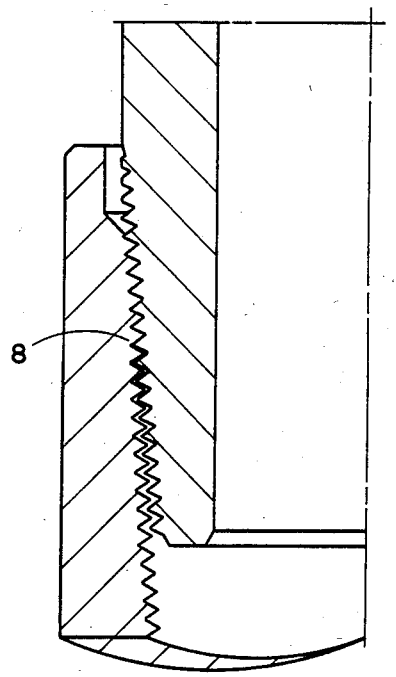
FIG. 2 is the same as FIG. 1 except tolerances allow the male thread to have a steeper taper than the female thread.
Figure 8:
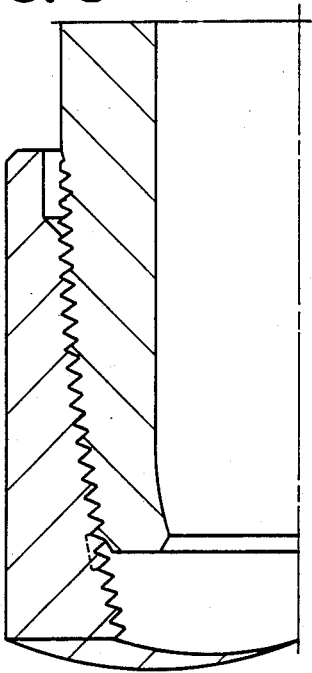
FIG. 8 is the same as FIG. 6 except the connection has been made up power tight.

When in the hand tight position as depicted in FIG. 3, threads of sections 18 or 16 do not engage the male pipe threads fully but only the smallest male thread will fully engage a female thread. After approximately one turn of power tight makeup, the first thread contact of section 16 occurs as at 21, the largest female thread. After two but before three turns of power tight makeup, all threads between the smallest contacting male thread and the largest contacting female thread are in contact. After three turns, the connection is power tight. When made up power tight as depicted in FIG. 4, all threads between the smallest of the male pipe threads and the largest of the coupling threads comprising sections 16, 18 and 20, are engaged in tight sealing contact. Of course before assembly, a conventional pipe thread sealing compound is applied to the threads so as to seal minute gaps that usually occur between the engaged threads. Thus, it will be appreciated that more thread contact pressure exists at the largest female thread as at 24 and at the smallest male thread as at 22 than exists in section 18 because a greater radial elastic deformation of the pipe and coupling has occurred at those two positions than has occurred within section 18. Dotted lines as at 17 and 21 shown within sections 16 and 20, respectively, illustrate the position of thread crests that would be the case in a conventional coupling per FIG. 1.

It is now apparent that a maximum sealing effect against internal fluid pressure may be formed at the smallest engaged thread diameter as at 22 and that a maximum sealing effect against external fluid pressure may be formed at the largest engaged thread diameter as at 24, by practice of the present invention. The seal as at 22 reduces the outward fluid pressure load on section 18 of the coupling to a minimum value and increases the outward fluid pressure load on the male thread to increase thread contact pressure to thereby allow a higher pressure rating for the connection and also provide for an enhanced axial tensile strength of the connection because all threads are in full intimate contact and the full engaged thread height is insured as in 16. The seal as at 24 prevents external fluid pressure from moving to a smaller diameter of the male thread, as to section 18, to thereby force inwardly on a thinner section of pipe and thereby reduce the pressure rating against external fluid pressure.

By way of example, a coupling to connect with a 5½" O.D. long thread 8 round API oil field casing thread may have the following dimensions: 0.625"±0.002 length of section 16; 1.696"±0.002 length of section 18; 0.975+0.030 or −0.002 length of section 20; a 5.40237 pitch dia at the left end of section 16; a 5.3649 pitch diameter at the left end of section 18 and a 5.2589 pitch diameter at the left end of section 20. Thus: a taper equal to the API pipe taper of 0.0625"/" would be formed in section 18; a slower taper, 0.0600"/" would be formed in section 16 and a faster taper, 0.0938"/" would be formed in section 20.

In some cases due to a poorly machined pipe thread, the conventional sealing compound may not be sufficient to seal off imperfections between the engaged threads. In that event, the pipe coupling may be formed with an annular space as at 26 of FIG. 5 by removing a portion of the female thread in section 20. A suitable seal ring of plastic or the like 27 may then be placed in the annular space before assembly of the connection so as to be deformed by and to seal against the male member during make up of the connection. So that the plastic seal ring 27 will not be extruded when the connection experiences an increase in operating temperature, the annular space should be made sufficiently large so as to allow for thermal expansion of the ring.

Figure 9:
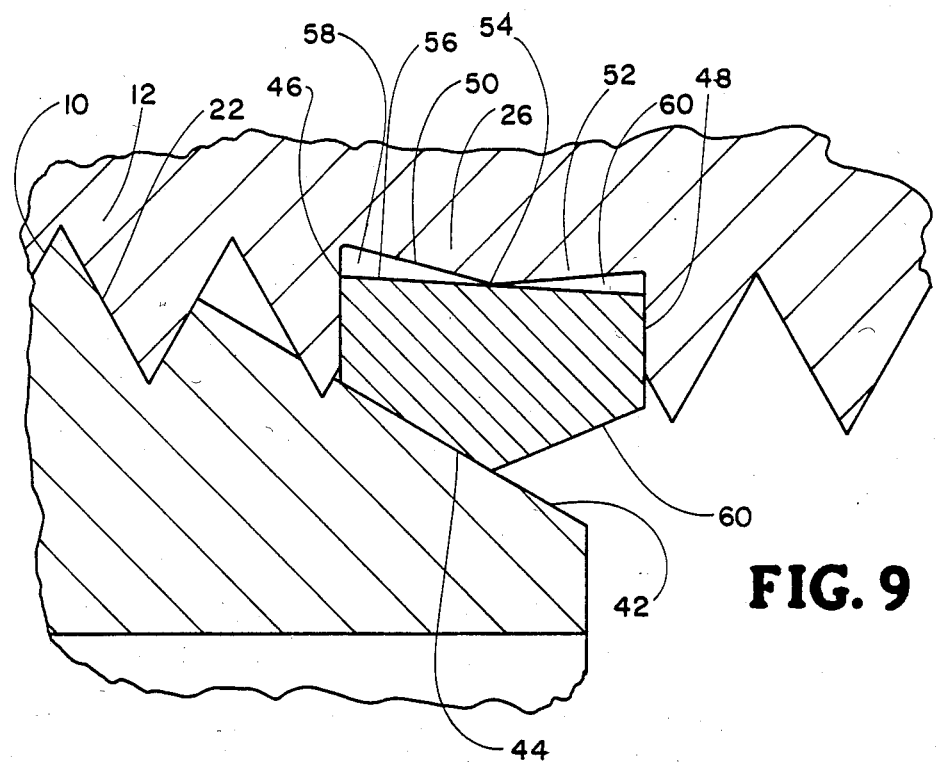
FIG. 9 is an enlarged fragmentary section of FIG. 5 to better detail the plastic seal one turn before full power tight makeup.

FIG. 9 illustrates plastic ring 27 within space 26 before full power tight makeup. Conical surface 42 formed on the male member adjacent the end thereof, is shown contacting but not moving, preformed cooperating conical surface 44 of ring 27.

Annular space 26 is partially defined by end surfaces 46 and 48 and conical surfaces 50 and 52, all formed within coupling 12. Surfaces 50 and 52 have a common circle of intersection as at 54 which contacts outer conical surface 56 of ring 27 before power tight makeup, thereby defining annular space 58 between portions of surface 46, 50 and 56 and defining annular space 60 between portions of surfaces 48, 52 and 56. Therefore, before power tight makeup, ring 27 substantially fills annular space 26 except for annular spaces 58 and 60. Ring 27 also projects radially inwardly from space 26, to conical surfaces 44 and 60 so as to provide sufficient ring volume to cooperate with surface 42 so as to provide proper compression of ring 26.

Figure 10:
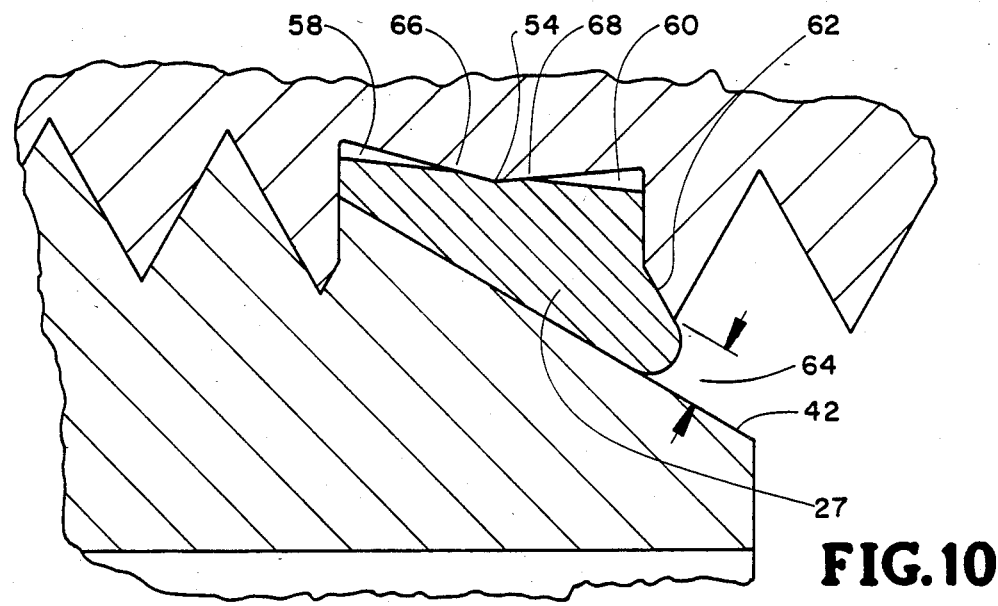
FIG. 10 depicts the plastic seal of FIG. 9 after full power tight makeup.

In FIG. 10, surface 42 is shown advanced to the position of power tight makeup, thereby forcing ring 27 farther into space 26, reducing but not filling spaces 58 and 60. Ring 27 is also shown deformed to fill the space between thread flank 62 and surface 42, which form a minute but a controlled annular relief passage 64 for escape of excess material of ring 27, over and above that required to cause ring 27 to seal against surface 42 and circle 54 to thereby prevent leakage of internal fluid pressure. A most important feature of the present invention is that the pressure on ring 27 to cause extrusion through passage 64 is not sufficient to cause ring 26 to fill spaces 58 and 60, the portions of surfaces 50 and 52 between 66 and 68 being sufficient to generate enough force on ring 27 required to move it into sealing position depicted in FIG. 10. Ring 27 may be made of any suitable material such as Teflon ® impregnated with glass to achieve the strength, chemical resistance and other characteristics required for the service intended.

It is now obvious that when the assembled connection is placed in service and is subjected to an increase of temperature, that differential bulk expansion of ring 27 will be accomodated by void spaces 58 and 60 such that no further extrusion occurs through passage 64, such that upon return of the temperature to normal, ring 27 will return to the position of FIG. 10. Therefore, a plastic seal that will withstand thermal cycling without leaking is provided by the present invention.

Figure 6:
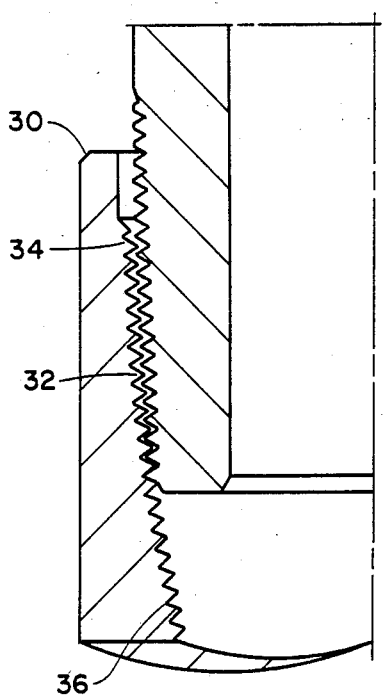
FIG. 6 is an alternative embodiment of the present invention shown in the hand tight position.

Another embodiment of the present invention is illustrated in FIG. 6 wherein coupling 30 is formed with female threads 32 which have a curved instead of a conical taper, the instantaneous taper being a minimum at the female thread of largest diameter 34 and increasing to a maximum taper angle as at 36. Taper angles at 34 and 36 may be the same respectively as tapers in sections 16 and 20 of FIG. 3.

Figure 7:
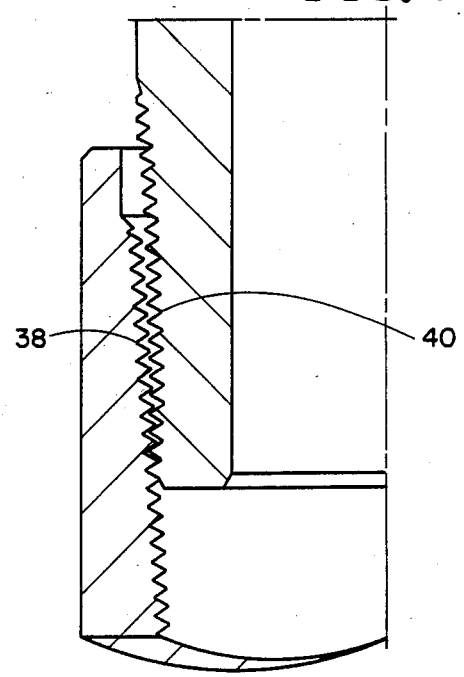
FIG. 7 is a third embodiment of the present invention shown in the hand tight position.

A variation of the embodiment of FIG. 6 is shown in FIG. 7 wherein the coupling has a single conical taper and the pipe has a curved taper 40 to accomplish the same end result as described above. A similar variation, not shown, may be made of FIG. 4 wherein the coupling was formed with a single conical taper and the male thread was formed with three sections having a taper near its end slower than the coupling taper, an adjacent taper the same as the coupling taper and a third taper faster than the coupling taper.

Figure 5:
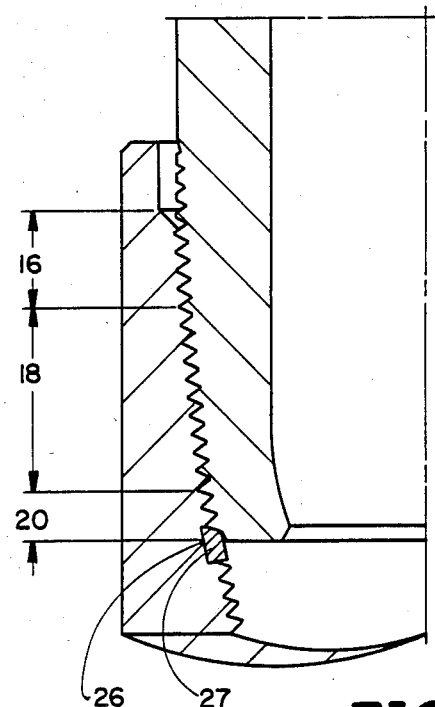
FIG. 5 is the same as FIG. 4, but with an annular space and plastic seal ring added in accord with the present invention.

While the variations of the present invention may have certain uses, the preferred embodiment is depicted in FIGS. 3, 4 and 5 for which applicants have immediate use.

We claim:

1. A threaded pipe coupling formed for sealing connection with a tapered pipe thread formed on the perifery of a pipe adjacent the end thereof, the coupling comprising an internal mating pipe thread having: a first section of maximum diameter, a second section of lesser diameter and a third section of least diameter; the first section having a smaller taper angle than does the pipe tread with which it mates; the second section having a taper angle substantially the same as does the pipe thread with which it mates; the third section having a greater taper angle than does the pipe thread with which it mates such that upon assembly of the pipe and coupling, a greater radial interference and thence a greater sealing force is exerted along the first section against external pressure and along the third section against internal pressure than is exerted along the second section.

2. The invention of claim 1 further comprising: the tapered pipe thread having only one taper.

3. The invention of claim 1 further comprising: sufficient contact pressure between pipe and coupling threads in the first section so as to seal against fluid pressure external to the pipe and coupling.

4. The invention of claim 1 or 3 further comprising: sufficient contact pressure between the pipe and coupling threads in the third section so as to seal against fluid pressures internal to the pipe and coupling.

5. The invention of claim 1 further comprising: a portion of the coupling threads of section 3 being removed so as to form an annular space sufficient to receive a ring of plastic suitable for sealing engagement with pipe external surfaces formed around and near the end of the pipe, upon assembly of the pipe and coupling.

6. The invention of claim 5 further comprising: the plastic ring being of smaller volume than the annular space sufficiently to allow for thermal expansion of the plastic ring without forcing adjacent threads from sealing engagement and without causing extrusion of the plastic ring from the annular space due to thermal expansion.

7. The invention of claim 5 further comprising: the annular space being defined by end walls formed by threads within the coupling; an outer wall formed by internal conical surfaces of the coupling which converge and intersect each other intermediate the end walls; and inner wall formed by an exterior conical surface of pipe adjacent the end thereof such that said walls cooperate to compress the ring of plastic upon assembly of the pipe and coupling so as to effect an improved sealing capability of the assembly.

8. The invention of claim 7 wherein: the conical surface of the pipe is formed with a cone angle to the axis of the pipe of approximately 25 degrees.

9. A threaded pipe coupling formed with internal pipe threads for sealing engagement with a pipe having tapered pipe threads around and adjacent the end thereof, an intermediate portion of the coupling threads being removed so as to form an annular space sufficient to receive a ring of plastic for sealing engagement with one or more surfaces near the end of the pipe: the annular space being defined by end walls formed by threads within the coupling; an outer wall formed by conical surfaces converging and intersecting intermediate the end walls; an inner wall formed by a conical outer surface of the pipe adjacent the end thereof.

10. The invention of claim 9 wherein: the conical surface of the pipe is formed with a cone angle to the axis of the pipe of approximately 25 degrees.

* * * * *